(12) United States Patent
Campbell et al.

(10) Patent No.: US 7,253,577 B2
(45) Date of Patent: Aug. 7, 2007

(54) INDEPENDENT SAFETY PROCESSOR FOR DISABLING THE OPERATION OF HIGH POWER DEVICES

(75) Inventors: Alan J. Campbell, New Berlin, WI (US); David G. Fullington, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 63 days.

(21) Appl. No.: 11/134,174

(22) Filed: May 20, 2005

(65) Prior Publication Data

US 2006/0261749 A1 Nov. 23, 2006

(51) Int. Cl.
*G05B 9/02* (2006.01)
(52) U.S. Cl. ............... 318/563; 318/565; 318/801; 363/50; 361/23; 700/21
(58) Field of Classification Search ........ 318/563–565, 318/568.16, 798–802, 3, 811, 782; 361/23; 363/37, 50; 700/2, 21, 79
See application file for complete search history.

(56) References Cited

U.S. PATENT DOCUMENTS

| | | | | |
|---|---|---|---|---|
| 6,208,536 | B1 * | 3/2001 | Boesche et al. | 363/37 |
| 6,239,566 | B1 * | 5/2001 | Tareilus et al. | 318/379 |
| 6,495,986 | B2 | 12/2002 | Schwesig | |
| 6,570,355 | B2 * | 5/2003 | Morita et al. | 318/563 |
| 6,573,672 | B2 * | 6/2003 | O'Rourke et al. | 318/254 |
| 6,573,681 | B2 * | 6/2003 | Schwesig | 318/801 |
| 6,745,083 | B2 | 6/2004 | Eckardt et al. | |
| 2005/0122641 | A1 * | 6/2005 | Fullington et al. | 361/23 |

FOREIGN PATENT DOCUMENTS

| | | |
|---|---|---|
| DE | 102 06 107 A1 | 9/2002 |
| DE | 102 07 834 A1 | 9/2002 |
| EP | 1 211 77 4 A1 | 11/2001 |
| WO | WO 2004/059812 | 12/2003 |
| WO | WO 2004/059828 | 12/2003 |

OTHER PUBLICATIONS

R.Kenner, G.Kobs, R.Weber, Digital Control of Industrial Servo Drives for Machine Tools, 8th Eutopean Conference on Power Electronics and Applications (EPE), Lausanne, 1999, Proceedings, CD-ROm EPE '99, paper No. 882.

* cited by examiner

*Primary Examiner*—Haissa Philogene
(74) *Attorney, Agent, or Firm*—Quarles & Brady LLP; Alexander M. Gerasimow

(57) ABSTRACT

A drive for delivering a high-power signal to a load includes a power circuit and a drive circuit. The power circuit is operable to provide a high power signal to the load in response to a control signal. The control circuit is operable to generate the control signal for activating the power circuit. The control circuit includes an application processor and a safety circuit. The application processor is operable to generate the control signal during a normal mode of operation. The safety circuit is operable to inhibit the generation of the control signal during a safe-off mode of operation. The safety circuit includes a safety processor independent from the application processor and operable to monitor the safety circuit.

21 Claims, 2 Drawing Sheets

INDEPENDENT SAFETY PROCESSOR FOR DISABLING THE OPERATION OF HIGH POWER DEVICES

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to drive circuits that are used to control the delivery of high power levels to high power loads, such as motors, and, more particularly, to an independent safety processor for disabling the operation of high power devices.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

High power devices are commonly employed in a variety of environments including, for example, industrial facilities and construction environments. High power devices generally include a variety of different devices including, for example, motors and heating devices. Although the operation of such devices under normal conditions does not pose undue risk, there are circumstances in which such devices must be reliably disabled so as not to pose risks to human beings or other devices.

For example, high power motors often rotate at high speeds and/or provide significant torques that in certain situations could pose risks to human beings or other devices that come into contact with the motors themselves or with other devices coupled to those motors. In particular, when such motors or devices coupled to those motors are replaced, fixed, modified, tested or otherwise operated upon by human beings such as engineers or service technicians, it is desirable that the motors be reliably disabled such that the motors cease to rotate or deliver sustained torque.

In view of the possible hazards associated with high power devices generally, many modern industrial and other facilities employ various electronic and other technologies that reduce the risk of accidents and enhance overall system safety. Additionally, standards have been developed with a goal of further reducing the risk of accidents. For example, with respect to industrial facilities, standards from organizations such as the NFPA, ISO, CEN, CENELEC, and the IEC have been developed to establish requirements for safety. The technologies used to enhance system safety often are designed to comply with, or to assist in making a facility compliant with, standards from one or more of these organizations.

Some of the technologies employed to enhance system safety are designed to reliably disable high power devices. For example, technologies such as high power contactors are often used to couple and decouple the driven devices to and from their high power drive circuits. Such contactors often include multiple, redundant high power contacts that are physically coupled to one another in such a way that, if one or more of the contacts become locked/welded in position, a signal is provided indicating that a fault has occurred. The signal can be, for example, the turning on of an indicator light at an operator interface or simply the failure of the high power device to start operating when commanded to do so.

Such high power contactors are often used because of their relative technical simplicity and reliability. Nevertheless, high power contactors are disadvantageous insofar as they are relatively expensive, and physically large and bulky. Further, in certain circumstances, the disconnecting and connecting procedures for implementing these high power contactors can be complicated and/or time consuming. Consequently, the implementation of such high power contactors can negatively impact the overall efficiency of an industrial or other system in which the high power devices are employed.

Because of these disadvantages, efforts have been made to find other mechanisms that could be used to disable high power devices. One alternate method of disabling a high power motor that has been attempted, for example, has involved disabling high power transistors of a drive circuit that deliver the high levels of power to the motor. However, this method has thus far proven to be insufficiently reliable.

Some safety systems employ a safety relay that when engaged locks out operation of the high power device. Such systems, however, are susceptible to a single failure of the safety relay compromising their safety function.

Therefore, it would be advantageous if a new mechanism could be developed that allowed for reliable disabling of high power devices such that the high power devices could not inadvertently start operating in a manner that might present a hazard. In particular, it would be advantageous if the new mechanism could provide a level of redundancy greater than a single failure and provide for detecting failures to increase the safety integrity level. Further, it would be advantageous if the new mechanism was relatively easy and inexpensive to implement.

BRIEF SUMMARY OF THE INVENTION

The present inventors have recognized that a safety circuit may be implemented providing a high degree of redundancy and fault monitoring by providing a safety processor independent of an application processor used for controlling the generation of high power drive signals during normal operation. The safety processor may inhibit the drive signals during a safe-off mode of operation.

One aspect of the present invention is seen in a drive for delivering a high-power signal to a load including a power circuit and a drive circuit. The power circuit is operable to provide a high power signal to the load in response to a control signal. The control circuit is operable to generate the control signal for activating the power circuit. The control circuit includes an application processor and a safety circuit. The application processor is operable to generate the control signal during a normal mode of operation. The safety circuit is operable to inhibit the generation of the control signal during a safe-off mode of operation. The safety circuit includes a safety processor independent from the application processor and operable to monitor the safety circuit.

Another aspect of the present invention is seen in a motor control system including a motor and a motor drive. The motor is operable to rotate responsive to at least one high power drive signal. The motor drive is operable to generate the at least one high power drive signal responsive to at least one control signal. The motor drive includes an application processor and a safety circuit. The application processor is operable to generate the control signal during a normal mode of operation. The safety circuit is operable to inhibit the generation of the control signal during a safe-off mode of operation. The safety circuit includes a safety processor independent from the application processor and operable to monitor the safety circuit.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
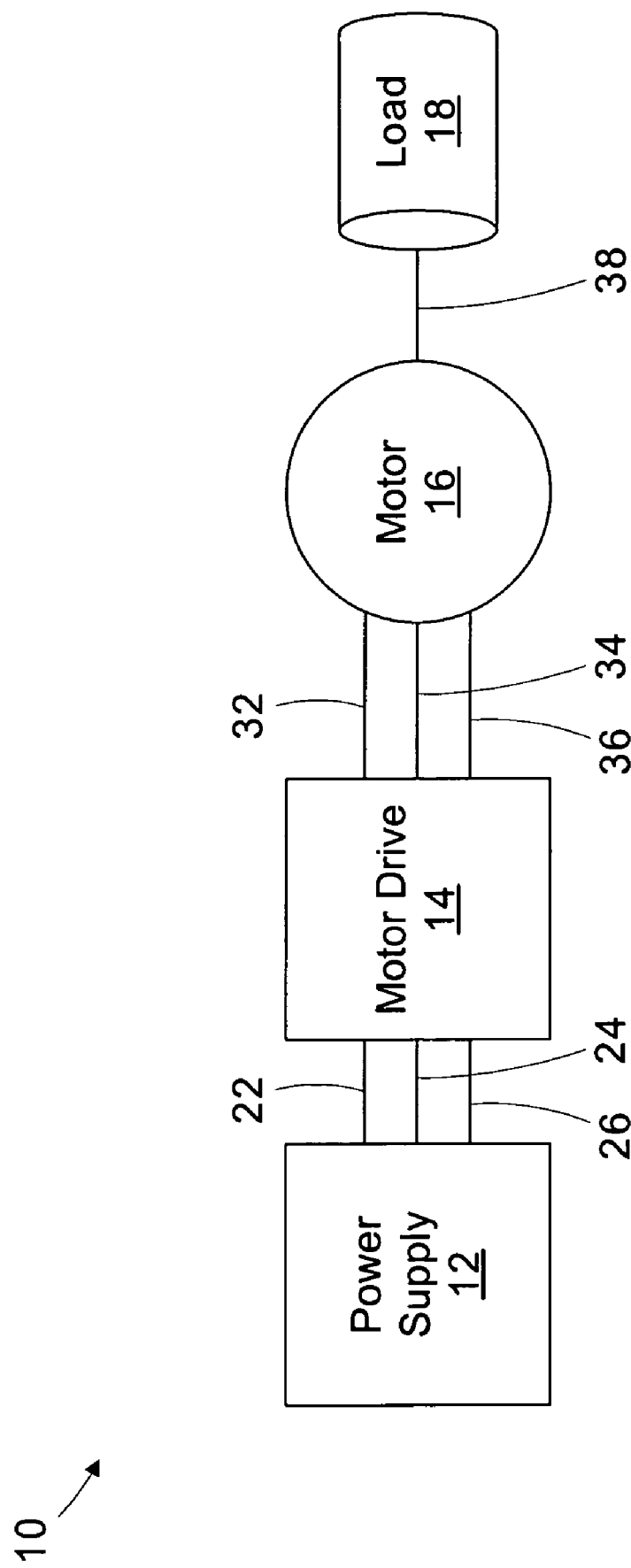
FIG. 1 is a simplified block diagram of a motor control system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the drawings wherein like reference numbers correspond to similar components throughout the several views and, specifically, referring to FIG. 1, the present invention shall be described in the context of a motor control system 10. The motor control system 10 includes a power supply 12, a motor drive 14, a three-phase motor 16, a load 18, and a plurality of lines and buses that link the aforementioned components together in the manner described hereinafter. The power supply 12 typically provides a three phase AC voltage received from a utility grid over lines 22, 24, 26. The nominal line voltage of the power supply 12 may vary depending on the particular implementation. The motor drive 14 includes a rectifier that receives 3-phase power from the power supply 12 and converts the AC power to DC and an inverter positioned between positive and negative DC buses of the rectifier that generate high power signals for driving the motor 16 over supply lines 32, 34, and 36. The inverter includes a plurality of switching devices that are positioned between the positive and negative DC buses and supply lines 32, 34, and 36 such that by opening and closing specific combinations of the inverter switches, positive and negative DC voltage pulses are generated on each of lines 32, 34, and 36. By opening and closing the inverter switches in specific sequences, AC voltages having controllable amplitudes and frequencies can be generated on each of supply lines 32, 34, and 36.

Each of lines 32, 34, and 36 is linked to a separate one of three-phase windings (not separately numbered or illustrated) of the motor 16. By providing known sequences of AC voltages across the motor windings, varying currents are caused therein which induce a rotating magnetic field within a motor stator core. A motor rotor (not illustrated) which is linked to a motor shaft 38 resides within the motor core. The rotor includes either bars or windings or both and, when the changing and rotating magnetic field within the stator core intersects the rotor, currents are induced within the rotor and the rotor currents in turn cause a rotor magnetic field within the stator core. The rotor field is attracted by the rotating stator field and hence the rotor rotates within the stator core. The load 18 is attached via shaft 38 to the rotor and therefore, when the rotor rotates, the load 18 also tends to rotate in the same direction.

Figure 2:
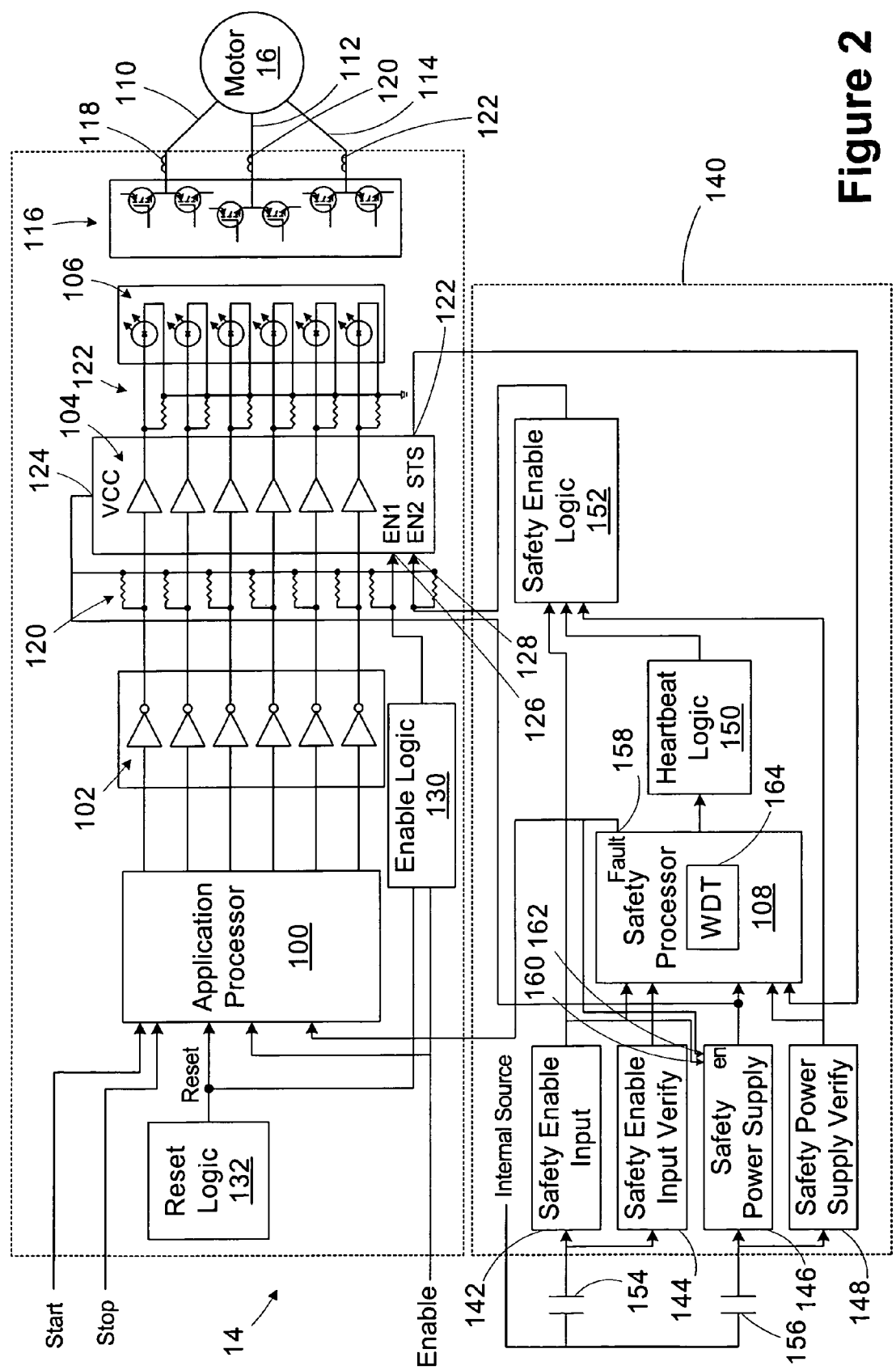
FIG. 2 is a simplified circuit diagram of a motor drive in the motor control system of FIG. 1.

Turning now to FIG. 2, a simplified block diagram of a control portion of the motor drive 14 is shown in greater detail. For ease of illustration, and to avoid obscuring the present invention, the rectifier portion of the motor drive 14 is not shown, but rather the control portions of the motor drive 14 are illustrated. The motor drive 14 includes an application processor 100, a hex inverter 102 with open collector output, a line driver 104, and optocoupler photodiodes 106 for generating the control signals that govern the supply of high power drive signals to the motor 16. The motor drive 14 also includes a safety processor 108 that selectively controls the enabling of the line driver 104 to allow normal operation or to place the motor drive 14 into a safe-off condition thereby preventing operation of the motor 16. In general the application processor 100 and the safety processor 108 may be implemented using general purpose or specialized independently functioning computing devices, such as microprocessors, which may have internal or external static or dynamic memory for storing variables and/or program instructions (e.g., software or firmware) for controlling the functioning thereof.

The terms "assert" and "deassert" are used herein to refer to the logic state of various control and/or enable signals. These terms are not intended to represent the Boolean state of the signal, but rather its logic state. For example, during normal operation a particular logic signal may be asserted using a Boolean "0" or a Boolean "1". In response to a fault condition, the logic signal may be deasserted by changing its Boolean state. Hence, in an example where an enable signal is deasserted, whatever Boolean logic level necessary for disabling the device receiving the enable signal is provided. If the device is enabled when its enable signal has a Boolean "1" value, it is deasserted by providing a Boolean "0" for the enable signal.

First, the normal operation of the motor drive 14 for generating drive signals for the motor 16 is described. As shown in FIG. 2, first, second and third phase drive signals are delivered to the motor 16 over lines 110, 112, 114, respectively. The optocoupler photodiodes 106 generate an optical signal that triggers associated power transistors 116 to generate the drive signals. For example, the power transistors 116 may be insulated gate bipolar transistors (IGBT) although, in alternate embodiments, other types of power transistor devices (or other, non-transistor power delivery devices) may be used. Current flows toward or away from the motor 16 in each phase depending upon which of the pair of corresponding power transistor devices 116 is switched on. If neither of the power transistor devices of a given pair is on, no current flows toward or away from the motor in the corresponding phase. Coils 118, 121 and 123, respectively, are coupled in series between the motor 16 and each of the power transistors 116. By virtue of the coils 118, 121, 123, the respective currents in each of the respective first, second and third phases on the lines 110, 112, 114 may be sensed using conventional current sensing components (not shown). In general, the power transistors 116 and associated rectifier circuitry represent a power circuit, while the processors 100, 108, hex inverter 102, line driver 104, and optocoupler photodiodes 106 represent a control circuit in the motor drive 14.

Each of the power transistors 116 is electrically isolated from the remainder of the control portions of the of the motor drive 14. As shown, the power transistors 116 are light sensitive devices that respond to light signals given off by the corresponding optocoupler photodiodes 106, respectively. The optocoupler photodiodes 106 are turned on and off based upon six control signals provided by the application processor 100, through the hex inverter 102, and the line driver 104. Depending upon the embodiment, the optocoupler photodiodes 106 may be physically separate from the power transistors 116 or, alternately, the optocoupler photodiodes 106 may be packaged along with their corresponding power transistors 116 in an integrated manner.

The application processor 100 is coupled to the hex inverter 102, which in turn is connected to the octal tri-state buffer/line driver 104. Pull-up resistors 120 may be provided on the inputs of the line driver 104 and pull-down-resistors 122 may be provided on its outputs. The voltage source (Vcc) provided for powering the line driver 104 also provides the voltage for the pull-up resistors 120. In some embodiments, additional pull-up resistors (not shown) may be provided on the outputs of the application processor 100.

The hex inverter 102 includes six individual inverter components, each of which inverts a respective one of the signals provided by the application processor 100 to produce signals for the line driver 104. During normal operation, the line driver 104 merely acts as a buffer between the signals from the hex inverter 102 and the control line outputs provided to the optocoupler photodiodes 106. That is, the signal level of each respective control line output is the same as the signal level of the corresponding inverter signal. The buffering performed by the line driver 104 is provided by way of six individual buffer components within the line driver 104, each of which is coupled respectively between a respective one of the hex inverter 102 individual elements and one of the optocoupler photodiodes 106. Further, because during normal operation the hex inverter 102 merely inverts the signals output by the application processor 100, the signals output by the driver 104 during normal operation have values that are opposite/inverted relative to the values of the provided by the application processor 100.

The line driver 104 does not, however, output signals that are the same as those output by the hex inverter 102 and inverted relative to those provided by the application processor 100 in all circumstances. Rather, the line driver 104 only outputs the correct signals in response to the signals from the hex inverter 102 if three conditions are met. First, power must be provided to the line driver 104 at its Vcc input terminal 124. Second, power must also be provided to each of two enable terminals 126, 128 of the line driver 104. Pull-up resistors 120 are also provided on the lines coupled to the enable terminals 126, 128. If any of these conditions are not met, the line driver 104 ceases to provide output signals corresponding to the signals generated by the application processor 100 for driving the motor 16. Instead, the signals output by the line driver 104 each take on a zero value or effectively-zero value in which no current is conducted to any of the optocoupler photodiodes 106.

The safety processor 108 monitors/controls the supply of power provided to the Vcc input terminal 124 of the line driver 104, and also to the pull-up resistors 120. Decoupling the power supply from the pull-up resistors 120 prevents current from flowing through the pull-up resistors 120 when the outputs of the hex inverter 102 take on a zero value. Further, because the hex inverter 102 is an open collector output device, the absence of power being supplied to the pull-up resistors 120 causes the components of the hex inverter 102 to enter high impedance, indeterminate states. While the hex inverter 102 outputs are in such indeterminate states, they are unable to take on high voltage values, and consequently, the input terminals of the line driver 104 remain at zero volts. Likewise, if the power supply is decoupled from the line driver 104 itself, the buffer components of the line driver 104 are unable to output nonzero currents on the lines coupled to the optocoupler photodiodes 106. Further, if a zero voltage level is applied to either enable terminal 126, 128 of the line driver 104, then each of the buffer components likewise is unable to provide a nonzero current on any of the control output lines to the optocoupler photodiodes 106.

In accordance with one embodiment of the present invention, these features of the line driver 104 are employed to provide redundant mechanisms for shutting down the low power logic section such that none of the power transistors 116 is commanded by any of the optocoupler photodiodes 106 to deliver high power to the motor 16.

The signal applied to the enable terminal 126 is controlled by enable logic 130, which reacts to an external enable input signal provided by a user for enabling the application processor 100. The enable logic 130 also receives an input from reset logic 132 associated with the application processor 100. In general, the enable logic 130 removes the signal on the enable terminal 126 of the line driver 104 if the hardware enable signal is absent or a reset is asserted.

As seen in FIG. 2, a safety circuit 140 is provided for shutting down the line drivers 104 and power to the pull-up resistors 120 to provide a safe-off condition. The safety circuit 140 includes the safety processor 108, a safety enable input block 142, a safety enable input verify block 144, a safety power supply block 146, a safety power supply verify block 148, heartbeat logic 150 associated with the safety processor 108, and safety enable logic 152 for controlling the second enable terminal 128 of the line driver 104.

The general safety status of the motor control system 10 is determined by the status of contacts 154, 156. Typically a switch, relay or other activation device (not shown) is associated with the contacts 154, 156 and activated to selectively enable or disable operation of the motor 16. For example, the contacts 154, 156 are both closed during a normal mode of operation and both open during an isolation mode. The isolation mode may be selected by an operator or other user to prevent the rotation of the motor 16, thus placing the motor 16 in safe-off condition. In the illustrated embodiment, the an internal voltage source on the circuit board on which the safety circuit 140 is mounted provides a supply voltage (e.g., 24V).

The output of the contact 154 is provided to the safety enable input block 142 and the safety enable input verify block 144. The outputs of the safety enable input block 142 and safety enable input verify block 144 are received by the safety processor 108 and monitored to determine their concurrence. If the outputs of the safety enable input block 142 and the safety enable input verify block 144 do not concur, the safety processor 108 indicates a fault condition by asserting a signal at a fault terminal 158. Hence, the safety enable input verify block 144 provides a measure of redundancy should the safety enable input block 142 fail. The output of the safety enable input block 142 is also provided to the safety enable logic 152 and an enable terminal 160 of the safety power supply block 146.

In the illustrated embodiment, the safety enable input block 142 and safety enable input verify block 144 are optically-isolated (e.g., by an optocoupler). The safety enable input verify block 144 circuit logic is inverted with respect to that of the safety enable input block 142 to ensure that a short cannot cause the safety enable input block 142 and safety enable input verify block 144 to attain the same state unless a failure has occurred. Hence, concurrence is determined if the safety enable input block 142 and safety enable input verify block 144 have opposite logic level outputs.

The output of the contact 156 is provided to the safety power supply block 146 and the safety power supply verify block 148. Again, the safety processor 108 monitors the output of the safety power supply block 146 and safety power supply verify block 148 to determine concurrence and indicates a fault condition if such concurrence is not present. The safety power supply verify block 148 provides a measure of redundancy should the safety power supply block 146 fail. The output of the safety power supply block 146 is also provided to the safety enable logic 152. The safety power supply verify block 148 provides the power supply signal for feeding the Vcc input terminal 124 of the line driver 104 and for powering the pull-up resistors 120.

In the illustrated embodiment, the safety power supply block 146 consists of a charge pump that provides a 5 V supply to the line driver 104. This circuit is inherently safe, in that without power to the input, no charge pump operation can occur and generation of output power cannot occur (i.e., a safe condition). The logic state of the safety power supply verify block 148 is inverted from that of the safety power supply block 146 to ensure that a short cannot cause the logics to attain the same state unless a failure has occurred.

For the safety power supply block 146 to operate and provide the requisite voltage source, it must receive enable signals at its enable terminals 160, 162. As indicated above, the first enable terminal 160 is coupled to the output of the safety enable input block 142. If the safety enable signal is not present (i.e., the contact 154 is not closed or the safety enable input block 142 has failed), the safety power supply block 146 does not provide power to the line driver 104 or the pull-up resistors 120. The second enable terminal 162 is coupled to the fault terminal 158 of the safety processor 108, such that the power is also removed from the line driver 104 and the pull-up resistors 120 in the event the safety processor 108 identifies a fault condition.

The heartbeat logic 150 provides monitoring of the safety processor 108 to determine its failure. The safety processor 108 outputs a periodic pulse, referred to as a "heartbeat." Should the safety processor 108 fail (e.g., a clock failure, significant clock slow-down), the heartbeat signal would cease, and the heartbeat logic 150 would detect its absence. For example, the heartbeat logic 150 may operate in the manner of a charge pump which decays to a safe-off condition in the absence of the heartbeat signal. The output of the heartbeat logic 150 is also provided to the safety enable logic 152.

Additional oversight for the safety processor 108 may be provided by a watchdog timer (WDT) 164 implemented in the safety processor 108. The firmware of the safety processor 108 constantly updates the WDT 164 to provide redundancy that the safety circuit 140 is operating correctly. For example, the WDT 164 may be set before starting the processing of the logic inputs to the safety processor 108 and reset after completion of the processing.

The safety processor 108 may also implement an internal diagnostics process to verify its proper operation. For example, during each loop in the main program, the firmware diagnostics may be called. The diagnostics procedure may check the firmware program checksum to verify the program has not been corrupted. The diagnostics program may also check RAM being used to verify that the data locations have not failed. In some embodiments, the storage registers may be duplicated and compared to verify the multiple locations do not disagree, thus adding additional redundancy to the program. If a failure is detected, the safety processor 108 indicates a fault condition at the fault terminal 158 state (i.e., notifying the application processor 100) and the diagnostics program would be halted (e.g., in an endless loop). The halted program will cause the heartbeat signal and WDT 164 to fail resulting in a safe-off condition.

The safety enable logic 152 provides the signal for enabling the line driver 104 at the second enable terminal 128. The safety enable logic 152 only enables the line driver 104 if the safety enable input block 142 indicates the enabling of the normal mode of operation, the heartbeat logic 150 indicates the proper operation of the safety processor 108, and the safety power supply verify block 148 indicates the presence of power for supplying the Vcc input terminal 124 of the line driver 104 and the pull-up resistors 120. If any of these conditions fail to exist, the safety enable logic 152 disables the line driver 104.

The line driver 104 further includes a status terminal 166 that provides a status signal indicating the status of the line driver 104. If either enable signal is removed from the line driver 104 at the enable terminals 126, 128, the disabling of the line driver 104 is indicated at the status terminal 166. The signal provided at the status terminal 166 is also monitored by the safety processor 108 to verify that its state agrees with what the safety processor 108 determines the state should be based on its independent monitoring of the inputs.

In response to identifying a fault condition, i.e., based on a lack of concurrence between the safety enable input block 142 and the safety enable input verify block 144, a lack of concurrence between the safety power supply block 146 and the safety power supply verify block 148, or the output of the safety enable logic 152, the safety processor 108 signifies the fault by asserting a signal at its fault terminal 158. This fault signal is provided to the application processor 100, thereby preventing its operation. The fault signal is also provided to the safety power supply block 146 to interrupt the power supply to the line driver 104 and pull-up resistors 120. In response to detecting the fault condition, the safety processor 108 also interrupts its heartbeat signal, causing the heartbeat logic 150 to stop asserting its presence to the safety enable logic 152, which, in turn, removes the signal at the second enable terminal 128.

Although only one set of inputs from the safety enable input block 142, safety enable input verify block 144, safety power supply block 146, safety power supply verify block 148, and safety enable logic 152 are illustrated, in some embodiments, each signal is provided to a redundant port on the safety processor 108, further increasing the redundancy of the monitoring. A logic analysis of the signal on each port may be performed independently and the results of each logic process may be compared to determine concurrence, and/or identify a fault condition with one of the ports. The processing of each port may also be tied into the generation of the heartbeat signal. For example, the processing of each port may be associated with half of the heartbeat signal cycle. If either process fails to run properly, the respective heartbeat will fail to clock (i.e., hang in a high or low state).

The arrangement of the safety circuit 140 also provides redundancy for the contacts 154, 156. If the contact 154 fails open, the absence of the safety enable input causes the safety enable logic 152 to remove the enable signal for the line driver 104. If the contact 154 fails closed, the open status of the contact 156 prevents power from being supplied to the line driver 104. If the contact 156 fails open, power to the line driver 104 is similarly removed. If the contact 156 fails closed, the power is still not provided to the line driver 104 and pull-up resistors 120, because the contact 154 is open, which removes the enable signal from the safety power supply block 146. The safety processor 108 may also identify a mismatch between the states of the contacts 154, 156 based on its monitoring.

When implemented as shown in FIG. 2, the motor drive 14 provides multiple, redundant avenues by which an operator or other control entity can cause the drive circuit to provide zero-level control signals via the control lines to the optocoupler photodiodes 106 such that the motor 16 ceases to receive power from the power transistors 116. The circuitry of the motor drive 14 is sufficiently redundant that it satisfies requirements of SIL-3 of the IEC61800-5-2 standard, which requires redundancy from component failures and the ability to detect such failures. The redundancy and monitoring capabilities of the safety circuit 140 are detailed above. The fact that the motor drive 14 satisfies SIL-3 requirements is not meant to indicate that the motor drive 14 guarantees that electrical voltage is not provided to the motor 16. Indeed, despite the nullification of the control line outputs to the optocoupler photodiodes 106, it is still conceivable that one or more of the power transistors 116 could apply voltage to the motor 16. Rather, because the motor 16 can only develop sustained rotation and torque if the power transistors 116 apply voltage at specific times in a pulse width modulated (PWM) manner determined by the application processor 100, inadvertent conduction of currents by any of the power transistor 116 would only, at most, cause the motor 16 to experience a one-time movement of a limited number of degrees, such as 180 degrees for a two-pole motor or 90 degrees for a four-pole motor. If the motor 16 is running when a safety isolation is triggered, the motor 16 will coast to a standstill. The removal of power from the Vcc input terminal 124 and pull-up resistors 120 by the safety circuit 140 prevents power from being provided to the optocoupler photodiodes 106, while the deassertion of the enable terminal 128 of the line driver 104 acts as a logic inhibit of the control line outputs.

The arrangement of the motor drive 14 also provides advantages for system integrity and certification. Because the safety processor 108 is independent from the application processor 100, changes can be made to the firmware of the application processor 100 without requiring a complete recertification of the safety functionality and firmware. Also, bugs present in the application firmware cannot compromise the safety functions of the motor drive 14. Hence, the safety circuit 140 and firmware implemented by the safety processor 108 can be certified one time for a family of products. The application firmware of one or more member of the family may be revised without affecting the safety certification. This separation reduces the cost of and the time required to implement revisions to the application firmware. The safety circuit 140 may be implemented on a different circuit board than the application processor 100 to further increase the separation therebetween. The line driver 104 may be included on either of the circuit boards, depending on the particular embodiment.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A drive for delivering a high-power signal to a load, comprising:
    a power circuit operable to provide a high power signal to the load in response to a control signal; and
    a control circuit operable to generate the control signal for activating the power circuit, comprising:
        an application processor operable to generate the control signal during a normal mode of operation; and
        a safety circuit operable to inhibit the generation of the control signal during a safe-off mode of operation, the safety circuit including a safety processor independent from the application processor and operable to monitor the safety circuit.

2. The drive of claim 1, wherein the control signal is indirectly coupled to the power circuit.

3. The drive of claim 1, wherein the control circuit includes a line driver operable to receive the control signal from the application processor, and the safety circuit is operable to disable the line driver during the safe-off mode of operation.

4. The drive of claim 3, wherein the control circuit is operable to remove power from the line driver.

5. The drive of claim 3, wherein the control circuit is operable to deassert an enable signal to the line driver.

6. The drive of claim 3, wherein the safety circuit further comprises a safety power supply block operable to generate a power supply for the line driver.

7. The drive of claim 6, wherein the safety circuit further comprises a safety power supply verify block operable to verify the presence of a power supply input to the safety power supply block, and the safety processor is operable to monitor outputs of the safety power supply block and the safety power supply verify block and identify a fault condition responsive to the outputs not concurring.

8. The drive of claim 6, wherein the safety circuit further includes a safety enable input block operable to receive a safety enable signal and enable the safety power supply block responsive to the safety enable signal being asserted.

9. The drive of claim 8, wherein the safety processor is operable to monitor outputs of the safety enable input block and the safety power supply block and identify a fault condition responsive to the outputs not concurring.

10. The drive of claim 6, wherein the safety circuit further includes a safety enable input verify block operable to verify the safety enable signal, and the safety processor is operable to monitor outputs of the safety enable input block and the safety enable input verify block and identify a fault condition responsive to the outputs not concurring.

11. The drive of claim 6, wherein the safety processor is operable to disable the safety power supply block responsive to identifying a fault condition.

12. The drive of claim 1, wherein the safety processor is operable to generate a heartbeat signal, and the safety circuit further comprises heartbeat logic operable to generate a signal for inhibiting the generation of the control signal responsive to detecting an absence of the heartbeat signal.

13. The drive of claim 3, wherein the safety circuit further comprises:
   safety power supply block operable to generate a power supply for the line driver;
   a safety power supply verify block operable to verify the presence of a power supply input to the safety power supply block;
   a safety enable input block operable to receive a safety enable signal and enable the safety power supply block responsive to the safety enable signal being asserted; and
   a safety enable input verify block operable to verify the safety enable signal,
   wherein the safety processor is operable to monitor outputs of the safety power supply block, the safety power supply verify block, the safety enable input block, and the safety enable input verify block to identify a fault condition.

14. The drive of claim 13, wherein the safety processor is operable to disable the safety power supply block responsive to identifying a fault condition.

15. The drive of claim 13, wherein the safety circuit further comprises safety enable logic operable to generate an enable signal for the line driver, the safety enable logic being operable to remove the enable signal responsive to a deassertion of one of the output of the safety enable input block and the output of the safety power supply verify block.

16. The drive of claim 15, wherein the safety processor is operable to generate a heartbeat signal, and the safety circuit further comprises heartbeat logic operable to generate an output responsive to detecting a presence of the heartbeat signal, and the safety enable signal is further operable to remove the enable signal responsive to a deassertion of the heartbeat logic output.

17. The drive of claim 3, further comprising an inverter coupled between the application processor and the line driver and at least one pull-up resistor coupled to a line coupling the inverter to the line driver, wherein the safety circuit is operable to remove a power supply provided to the pull-up resistor during the safe-off mode of operation.

18. The drive of claim 1, wherein the safety processor is operable to identify a fault condition in the safety circuit.

19. The drive of claim 18, wherein the safety processor is operable to notify the application processor of the fault condition.

20. The drive of claim 1, wherein the load comprises a motor.

21. A motor control system, comprising:
   a motor operable to rotate responsive to at least one high power driven signal; and
   a motor driven operable to generate the at least one high power driven signal responsive to at least one control signal, the motor driven comprising:
      an application processor operable to generate the control signal during a normal mode of operation; and
      a safety circuit operable to inhibit the generation of the control signal during a safe-off mode of operation, the safety circuit including a safety processor independent from the application processor and operable to monitor the safety circuit.

* * * * *

UNITED STATES PATENT AND TRADEMARK OFFICE
CERTIFICATE OF CORRECTION

PATENT NO. : 7,253,577 B2 Page 1 of 1
APPLICATION NO. : 11/134174
DATED : August 7, 2007
INVENTOR(S) : Alan J. Campbell et al.

It is certified that error appears in the above-identified patent and that said Letters Patent is hereby corrected as shown below:

Column 12, Claim 21, line 28, "driven" should be --drive--.

Column 12, Claim 21, line 29, "driven" should be --drive--.

Column 12, Claim 21, line 30, "driven" should be --drive--.

Column 12, Claim 21, line 31, "driven" should be --drive--.

Signed and Sealed this

Twenty-third Day of September, 2008

JON W. DUDAS
*Director of the United States Patent and Trademark Office*